Jan. 1, 1929.
R. P. LANSING
1,697,394
VEHICLE SPRING CONTROLLING APPLIANCE
Filed Oct. 16, 1924   2 Sheets-Sheet 1
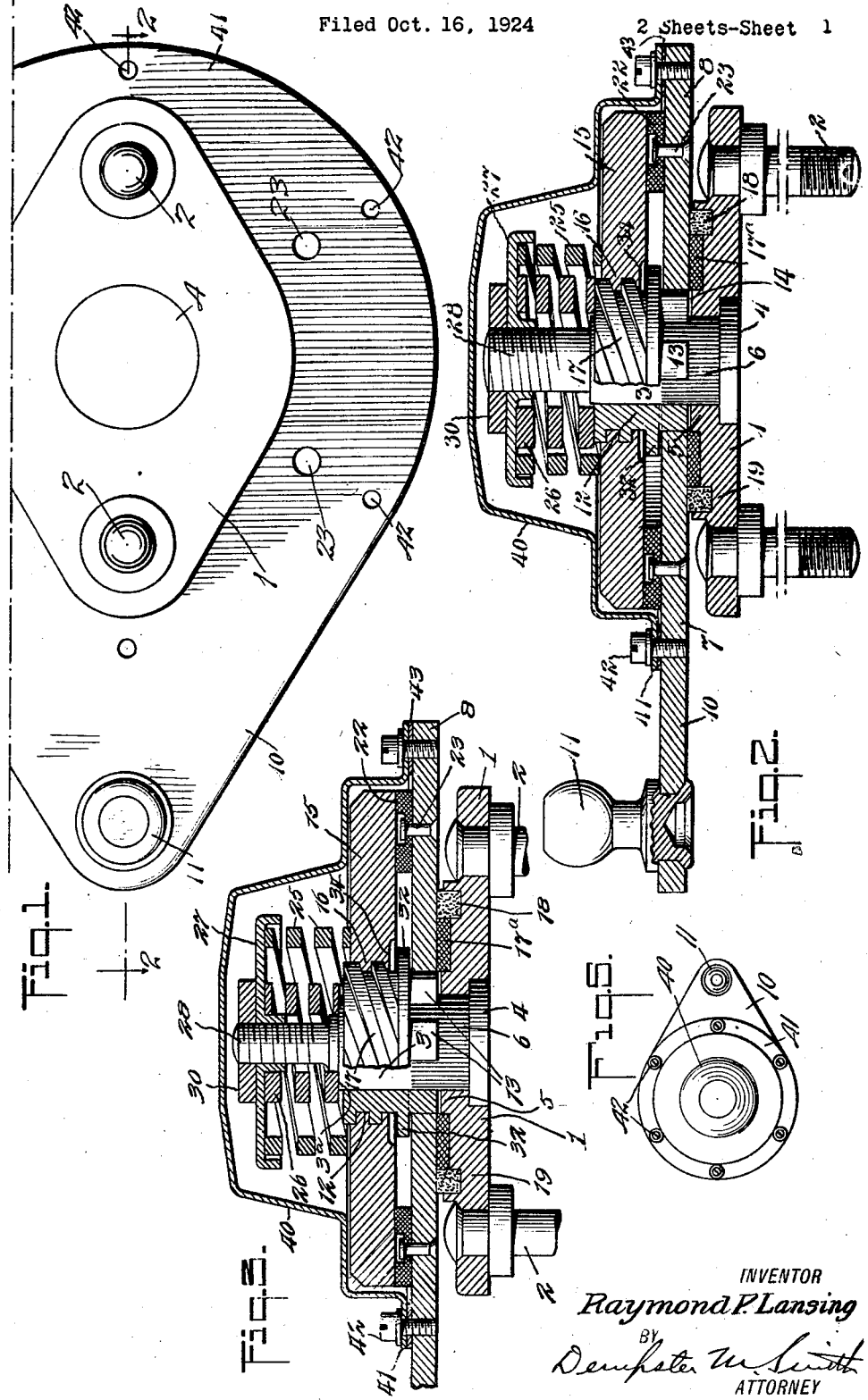
INVENTOR
Raymond P. Lansing
BY
Dempster M. Smith
ATTORNEY Jan. 1, 1929.  1,697,394
R. P. LANSING
VEHICLE SPRING CONTROLLING APPLIANCE
Filed Oct. 16, 1924 2 Sheets-Sheet 2
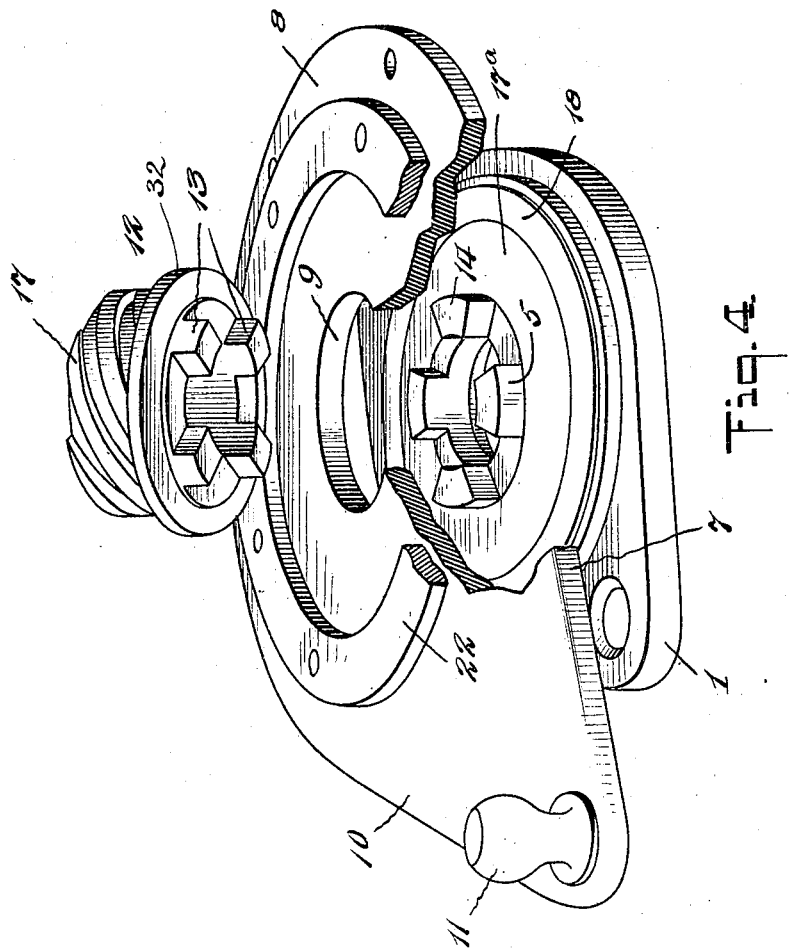
INVENTOR
Raymond P. Lansing
BY
Dempster M. Smith
ATTORNEY Patented Jan. 1, 1929.

1,697,394

UNITED STATES PATENT OFFICE.

RAYMOND P. LANSING, OF MONTCLAIR, NEW JERSEY.

VEHICLE SPRING-CONTROLLING APPLIANCE.

Application filed October 16, 1924. Serial No. 743,921.

My invention relates to appliances for controlling the action or movement of vehicle springs, or spring-connected vehicle parts such as the frame and axles.

An important object of the invention is to provide a simple, strong and durable appliance of the friction type which applies a predetermined maximum frictional resistance to the vehicle spring action in one direction of movement, this maximum resistance being applied very quickly after the beginning of the stated movement, and continuing to the end of the movement, the resistance to vehicle spring movement in the other direction usually being materially less and in some cases relatively very small.

Another object is to allow for moderate relative vehicle body and axle movement, as when the vehicle is traveling over approximately smooth surfaces, by providing a comparatively small frictional resistance to such movements in either direction within a limited range, or, in some cases, practically or entirely eliminating resistance in one direction of relative movement.

A further object is to avoid any, or any considerable resistance to return movement of the vehicle axle in relation to the body, after it has moved in one direction, and especially to avoid resistance at the beginning of the return movement; and in attaining this object, the means employed may be such that instead of offering any resistance to the initiation of the return movement, such movement may be, and preferably is, actually facilitated.

A further object is to produce the above stated effects or results in an appliance in which the friction members have an oscillating or rotative movement about an axis, and further, to produce the friction effects by the action of a spring or springs in conjunction with inclined surfaces, such as screw threads, which control or modify the spring action.

A more particular object is to provide an appliance in which the effective length, or radius of one of the principal relatively-movable friction members may, when necessary or desirable be made shorter than is usual in friction devices of this class, and to provide friction members or surfaces, pressure applying means and pressure controlling means especially adapted to the use of such a short lever arm. More particularly stated, when a short lever arm is used the friction members or surfaces may be reduced in number, or their friction values may be smaller than would otherwise be necessary, or the pressure values may be lower, while producing substantially the same retarding effect that is practicable when a longer lever arm is used with a greater number of friction members or surfaces, or higher friction or pressure values.

The provision of a structure having a short lever arm, with other suitable characteristics, as sufficiently explained above and hereafter, enables the shock absorbing appliance to be advantageously used in certain particular locations, for example, at the front end of a motor vehicle to control the action of the front vehicle spring where the axial movement is relatively small, and therefore the short lever arm provides a sufficient range of movement when connected by a link to the front axle, without danger of excessive angularity which might produce a reversal of the normal arm and link relation, sometimes referred to as a "toggle" effect. The short lever arm furthermore permits the shock absorber to be advantageously used and properly mounted at the front end of a motor vehicle employing front wheel brakes, in which the brake drum or linkage interfere with the proper installation of ordinary shock absorbers or those employing long lever arms. A companion application executed on even date herewith, particularly shows and claims a representative installation of short-arm shock absorber of the present general type at the front end of a motor vehicle, in such a way as to avoid conflict with the front wheel brake drum and brake linkage, and such an installation or combination is therefore not claimed herein.

While the invention is especially useful in connection with a short lever arm, it is not so limited, and its structural and operative principles are applicable to employment with lever arms of any reasonable length.

A further object is to provide, in improved and simplified form, an appliance of this class in which different friction surfaces have different friction values and to thus improve the action of the appliance as more fully explained hereafter.

The present invention, as represented by the exemplifying embodiments shown, is in certain respects similar to my co-pending applications, Ser. No. 713,532, and Ser. No. 713,533, filed May 15, 1924, with important modifications and improvements, as sufficiently referred to above or explained hereafter.

The characteristics and advantages of the invention are further sufficiently explained in connection with the following detail description of the accompanying drawings, which show certain exemplifying embodiments of the invention. After considering skilled persons will understand that many variations may be made, and I contemplate the employment of any structures that are properly within the scope of the appended claims.

Fig. 1 is a rear elevation of a shock absorber embodying the invention in one form, that is, a view looking at the side of the base plate 1 which is connected against the outer face of a vehicle side frame chamber.

Fig. 2 is a horizontal section thereof at 2—2, Fig. 1.

Fig. 3 is a similar section of a modified form of the appliance.

Fig. 4 is a perspective view showing certain principal parts of the mechanism in partly-separated positions.

Fig. 5 is a front elevation of the appliance; that is, looking at the outer side as applied to the vehicle frame (not shown).

Referring first to Figs. 1, 2 and 4: The appliance as there shown in one preferred form, is usually built upon or around a main or base plate 1, which is sometimes identified as a "friction member", and is arranged for connection in any convenient way to a part of the vehicle. Specifically the main plate as here shown is arranged for connection to a vertical face of the chassis frame near an axle, by means of bolts or stud screws 2. A spindle 3 extends horizontally at the center of the main plate, and for manufacturing convenience is usually made in a separate piece, having a head 4 located in countersink in the main plate. The main plate is preferably formed with a projecting sleeve 5 and the spindle portion fitting within this sleeve is provided with longitudinal teeth or serrations 6 to prevent rotation of the spindle, although there is no considerable force tending to cause rotation of the spindle in relation to the plate.

Another friction member, which is most conveniently in the form of a flat plate 7 of substantial thickness, is arranged for rotative movement about the spindle, and conveniently the generally-circular main portion 8 of the plate is formed with a circular central aperture 9, which has a bearing fit on the periphery of sleeve 5 or an outward portion thereof. A lever arm 10 is, for convenience, usually formed integral with plate 8, and in certain preferred embodiments of the invention this lever arm is made quite short and it may in fact, in certain cases, be only about one-half the length of the lever arm usually employed. This arm is arranged in any convenient way for connection to another part of the vehicle, such as an axle which is spring connected to the chassis frame, and for this purpose a ball fitting 11, or any other suitable device is provided, as usual in appliances of this class.

A member 12, which may be broadly described as a controlling member, or otherwise more particularly as a shifter or nut, is centrally bored to fit about the spindle and has a close sliding fit thereon to provide for axial movement. The shifter is held against rotation in any desirable way. Conveniently, as in the present example, the inward end is provided with spaced jaws 13 fitting between complemental jaws 14 formed in the outward end of sleeve 5.

A third friction member or plate 15 is arranged for rotative movement in relation to the other members, and particularly, in the present example, it is centrally bored and the bore is cut to provide screw threads 16 of suitable pitch engaging complemental screw threads 17 of the shifter. The pitch of the screw threads may vary considerably, but a pitch angle of about 30 degrees, more or less, as approximately represented in the drawing, is suitable in certain cases. The pitch angle may be varied within reasonable limits, in accordance with the pressure effects desired to be produced, or with the amount of yielding pressure provided by such devices as springs referred to hereafter, or otherwise in accordance with various factors of design.

Plate 8 has a frictional co-operation with plate 1, and preferably for this purpose a flat ring $17^a$ of suitable friction material is placed between the plates and is located or centered in relation to plate 1 by engagement of the edge of its central aperture about sleeve 5. The outer surface of the friction ring bears against the inward surface of plate 8, and the ring may be secured to either plate or left free, and in that case will normally remain stationary in relation to plate 1. The material of which ring $17^a$ is composed may vary considerably, but in a preferred case, in order to provide a relatively small friction co-efficient, it is of relatively hard material such as the class of material generally known as "fibre", which does not provide a very high friction co-efficient in contact with metal; or in some cases the ring $17^a$ may be of a suitable metal such as bronze. The area, or more especially the average radius, of this ring is also moderate, or smaller in relation to another friction surface later described, for reasons also explained hereafter.

In some cases the friction effect at the surface of ring $17^a$ may be so small, especially where the ring is of bronze or some other suitable metal, that it may be considered substantially negligible and the ring $17^a$ or equivalent part of plate 1, in engagement with plate 8 may then be considered simply a thrust bearing for plate 8, which is urged to engagement with this bearing surface by one and at times by both of the pressure springs later described.

Desirably, a packing ring 18 of felt or other suitable compressible material is located about the friction ring 17ª and in contact with plates 1 and 8. Conveniently this packing ring may be located in an annular recess 19 in plate 1. This packing ring serves to entirely or substantially exclude dirt and moisture or to retain lubricant when lubricant has interior access to the friction surface.

Plate 15 has frictional co-operation with the outer surface of plate 8, and desirably, a flat ring 22 of suitable friction material is placed between the plates, and conveniently it is secured to one of the plates, such as plate 8, by rivets 23 having their outer heads countersunk into the friction ring. Otherwise the friction ring may be free and in that case, may be held against lateral dislocation in any suitable way, for instance, by a flange formed on one of the plates. Although the material of friction ring 22 may vary considerably, it is preferably of a material such as asbestos or an asbestos fabric such as commonly used for brake and clutch facings, or of other suitable material having preferably a higher friction co-efficient in contact with metal than the friction ring 17ª, and also, desirably, the area or average radius of ring 22 is considerably larger than that of ring 17ª, to provide a higher friction value, for reasons explained below.

Suitable means are provided for producing frictional pressure between the various friction members or plates. Yieldable devices, such as springs, are usually employed for this purpose and there may be one or more such means or devices.

Preferably, as shown in the present specific embodiment the pressure producing means consists of two springs 25 and 26. Spring 25 is arranged to bear against plate 15 and also against an abutment consisting of a disc or nut 27 adjustably engaging a screw thread 28 on the outward portion of spindle 3, which may desirably be of reduced diameter. The nut or spring abutment is secured in adjusted position by a lock nut 30. The other spring 26 is conveniently arranged within spring 25 and is usually a stiffer or heavier spring to provide a larger pressure value. One end of spring 26 bears against the outer end of shifter 12 and the other end bears against the abutment 27.

Normally the shifter is firmly seated in an inward position in relation to plate 1. For this purpose the ends of lugs 13 may be dimensioned to bear on the flat faces of sleeve 5 intermediate lugs 14, or in any other convenient way, a firm seat is provided for the shifter when in its inward position, and this seat is arranged so that the inward movement of the shifter is not limited by contact with any relatively movable part, such as plate 8. Therefore, while the shifter is desirably formed with a flange 32 intermediate its jaws 13 and the screw threads 17, this flange is arranged to provide a clearance between it and the outer face of plate 8 when the shifter is in its inward or seated position, as clearly shown in Fig. 2. A clearance, as also clearly shown in that figure, is provided between the outer face of the flange and plate 15, this clearance being conveniently provided by forming a recess 34 in the plate surface adjacent to the flange. This clearance insures the proper bearing of plate 15 on friction ring 22, and allows for a reasonable amount of wear, so that the appliance will operate for a long time without adjustment, even if the wear of the friction surface is quite substantial.

The inner spring 26 and the nut are arranged or dimensioned to avoid contact between the spring and plate 15 when the latter moves out slightly under certain conditions, or otherwise stated, the spring bears on the outer end of the nut, which is located outwardly from the outer face of plate 15 sufficiently to avoid any contact between the plate and the spring end, even when the spring is, as shown of slightly greater diameter than that of the nut.

A cap or housing 40 is usually provided, consisting of a piece of stamped sheet metal enclosing the outer portion of the spindle and springs 25 and 26, and also plate 15 and friction ring 22, and shaped to provide clearance for the necessary slight outward movement of plate 15. The inward portion of the housing is in the form of an annular flange 41 secured to plate 8 by screws 42, usually with an interposed gasket 43 to completely exclude dirt and moisture and retain lubricant. The cover or housing 40 tightly secured to plate 8 encloses and practically seals the entire rotary structure, including plate 15 with its main friction surface bearing on ring 22, and will serve to contain lubricant in contact with all the enclosed parts if lubricant such as an oil or grease, in considerable quantity, is employed. The only moving part or surface not enclosed and protected by the cover is the surface of plate 8 moving against ring 17ª, which, however, is not a main friction surface, but as above stated, has a relatively small friction value and may in one sense be considered a thrust bearing having moderate friction effect. This bearing surface is moreover, sufficiently protected by the compressible packing ring 18. When lubricant of a suitable kind, such as a moderately thick grease, is employed within the casing, it will not only serve to lubricate all of the parts including the main friction surface, and thus reduce wear and provide very smooth action, but it acts as a cushioning agent between such relatively movable parts as flange 32 and plate 15, and between inward portions of the nut or the nut lugs 13 and the end of the short sleeve 5 or the sleeve lugs; and this cushion prevents objectionable noise which in the absence of lubricant would be occasioned by the stated parts coming in contact with considerable force as the nut moves to and fro, axially, on the spindle. In the present specific construction, however, since only a single main friction surface is provided, it will usually be insufficient for shock absorber purposes in the presence of lubricant, which very materially reduces the friction coefficient; and the present appliance will therefore usually be employed without lubricant or with only a small quantity of lubricant, such as graphite grease applied to the screw threads.

Companion applications executed on even date herewith, show shock absorbers which are in certain respects similar to the present structures, but which provide two or more main friction surfaces and are therefore better adapted to be filled with lubricant which may come in contact with the friction surfaces without reducing the retarding effect to an undesirable extent. The broader claims for the lubricating and noise-preventing characteristics of the present invention are therefore included in said companion applications, and these features are only claimed herein in connection with an appliance substantially as shown and described, or one having only a single main friction surface enclosed between plate 8 and the cover or housing 40.

One of the springs, namely, spring 25 in the present arrangement, by outward pressure exerted on the end of spindle 3 and inward pressure exerted on plate 15 and through that on plate 8, constantly urges plate 8 in contact with the bearing or friction ring 17ª and in that way provides a substantially tight fit for the rotating structure including plate 8, housing 40 and certain of the enclosed parts in relation to the fixed plate 1, and this close fit tends to entirely or substantially retain lubricant (if lubrication is employed) which might otherwise find its way out through the aperture of plate 8. Certain claims herein, therefore, refer to this arrangement for maintaining a practically tight seal as between the rotating and non-rotating parts of the structure or between plate 8 and external relatively fixed parts, including the bearing surface 17ª. In companion applications, arrangements are shown by which not only a relatively light spring, such as 25, but a heavier spring, such as 26, both exert pressure tending to maintain a seal at the point stated. Therefore, this item of the invention is referred to herein in claims limited to a structure in which only one of the springs acts in the manner described, and broader claims referring to this spring action or sealing effect, and also claims which definitely include the arrangement or action of the heavier or main pressure spring, such as 26, for this purpose, are included in the other applications.

The appliance may be arranged to oppose greater resistance to vehicle spring compression than to spring recoil, but in most cases it is considered desirable to apply the greater frictional resistance to spring recoil, and the operative explanation will therefore be made with the understanding that the appliance is so arranged; and it will then be evident how the greater resistance could be applied to vehicle spring compression by a mere inversion of the appliance or by reading the operative description with appropriate changes in words describing positions or directions of movement.

With the device arranged as stated, and with a right-hand thread on the nut, as shown, when the vehicle spring and axle are in normal position, the parts are in the position shown in Fig. 2. The nut 12 is in its inward position, resting against sleeve 5 or portions thereof; spring 26 is compressed between the abutment 27 and the outer end of the nut and exerts pressure effect upon the plates; spring 25 is compressed between the abutment and plate 15 and presses that plate in contact with plate 8 or its friction ring 22, and also presses plate 8 in frictional contact with plate 1 or its ring 17ª, this pressure usually being quite moderate, due to the fact that spring 25 has a moderate pressure value when properly designed and adjusted for the present purpose.

With the vehicle in motion, when slight ground-surface irregularities are encountered by the road wheel, as in running on a relatively smooth surface, the slight axle movement or jiggle thus produced causes slight angular movement of plate 8 in either direction, and within this range of movement the friction resistance is moderate and is equal in both directions. Under these conditions the only relative movement of friction members or surfaces, is that between the inner surface of plate 8 and friction ring 17ª, since the frictional engagement of plate 15 with friction ring 22 causes plates 15 and 8 to move together through the range of angular movement of plate 8 which corresponds to the clearance between the nut threads 17 and plate threads 16. It is desirable in the manufacture of such threads, to provide a moderate clearance in order to provide for smooth movement of the threads in relation to each other, and this clearance is also desirable for functional reasons to permit the small angle of relatively free movement just described. The frictional resistance to this slight or normal axle movement is moreover very small or in some cases practically negligible, not only because it occurs only at a single surface of frictional contact, but because that surface is of relatively small area or average radius or because the frictional coefficient at that surface is relatively small, or for both of these reasons. In brief, therefore, the device opposes a small or negligible resistance to relative movement of the vehicle body and axle when running over smooth roads, or when only minor irregularities in the road surface are encountered.

When the road wheel strikes a road-surface projection of considerable height, the axle moves up in relation to the frame, sufficiently to carry the end of lever arm 10 upward or toward the eye of the observer, in Fig. 2, beyond the central or approximately free range of movement above referred to, or through an angle of movement greater than that corresponding to the thread clearance. Thereupon inward surfaces of screw threads 16 engage outward faces of threads 17, and in the slight further movement of the arm and plate 8 the co-operative action of the screw threads causes plate 15 to be "lifted", or moved outward slightly against the thrust of spring 25. The pressure on the friction surface of plate 15 is thus relieved to such an extent that it remains stationary and frictional slippage occurs between plate 15 and ring 22, this being proportional to the pressure of spring 25 and the area or average radius and friction coefficient of the friction ring. This frictional resistance while fairly moderate is considerably greater than that afforded by friction ring 17$^a$ and is added to the frictional effect of the last named ring so that up to the end of the vehicle spring compression movement now being described, a larger frictional resistance is provided, tending to check that movement; but this resistance is desirably not so great as the resistance afforded to spring recoil.

After spring compression, as the axle commences to return to normal position, plate 15 moves along with plate 8 because of the frictional contact between these members, and this movement is facilitated by the pressure of spring 25 in connection with the angle of the screw threads (unless the thread angle is very moderate). With the proper thread angle or one substantially corresponding to that represented in the drawing, the pressure of spring 25 is sufficient to actively urge plate 15 to rotate as it moves slightly inward and until the thread clearance is taken up. During this movement frictional resistance occurs only between plates 1 and 8, and due to the small friction value the resistance effect is small, or in some cases practically negligible. The described movement until thread clearance is taken up is very slight, corresponding to a very small angle of movement of arm 10. This slight substantially free movement at the beginning of the recoil is of value in some cases because it prevents any tendency to locking of the parts at the beginning of the recoil movement, or in other words, prevents an abrupt recoil checking. More especially the described arrangement of parts and the operative effect is important because there is no locking effect at the end of the previous vehicle spring compression movement, since, as stated, plate 15 not only tends to move along with plate 8 at the beginning of the ensuing recoil movement, but is actively urged to so move by the combined effect of spring 25 and screw threads 16 and 17.

At the end of the first small angle or recoil movement, the outer faces of screw threads 16 encounter the inward faces of threads 17, and then in the slight ensuing movement of plate 15 along with plate 8, the shifter or nut 12 is "lifted" or moved slightly outward away from its seating against sleeve 5, and immediately the full pressure of spring 26 becomes effective through the nut and plate 15 upon both of the friction surfaces, that is to say, between plates 15 and 8, and 8 and 1. After slight further rotation of plate 8, nut flange 32 strikes the inner face of plate 15 or in other words, the plate is locked against the nut and cannot rotate farther. That portion of the movement of plate 8 during vehicle spring recoil from the moment when nut 12 commences to move outward to the point where plate 15 is locked (after the clearance provided by recess 34 is taken up) may be conveniently described as the "wind-up period", during which spring 26 is compressed slightly in addition to its normal compression. The resistance to the movement of plate 8 and the lever arm is increased during this wind-up period in proportion to the work required to compress the spring. As soon as the spring is fully compressed and plate 15 is locked against further movement as above described, the further rotation of plate 8 causes slippage in relation to plate 15, as well as in relation to plate 1, with a friction effect at both surfaces proportional to the pressure value of both of the springs and with a frictional retarding effect between plate 15 and ring 22, which is of relatively high value, due to the high friction coefficient of the friction ring and its large average radius, and with smaller friction effect at the surface of ring 17$^a$ due to its lower coefficient and smaller average radius. These conditions continue to the end of the recoil movement, and if the vehicle spring was previously compressed to any considerable extent, with a corresponding fairly large range of recoil movement, maximum retarding force with slippage at both friction surfaces is applied through the greater part and usually all but a small part of the total recoil movement. This retarding value, when it has once been quickly built up to maximum in the manner described, remains practically constant throughout the remainder of the stroke, the only variation in retarding value being due to the changing angularity of the lever arm, the effect of which may be disregarded for the purposes of the present invention.

At the end of any considerable vehicle spring recoil movement, as above described, nut 12 is in its outward position and locked against plate 15, and spring 26 is in full compression. There will practically always be at least a slight compression movement of the vehicle spring following recoil. In any such slight movement or any greater movement, due to vehicle spring compression, arm 10 again moves counter-clockwise to permit the nut to move inward and seat against the end of sleeve 5. Any tendency to lock at the beginning of that movement is prevented by arranging the screw threads 16 and 17 with a proper angle so that the pressure of spring 26 acting through the nut and screw threads, tends to cause rotation of plate 15, rather than to oppose such rotation. Therefore, in the first part of the vehicle spring compression movement, plate 15 easily rotates along with plate 8 by the frictional contact of the two, and this movement is usually actually facilitated by the spring effect, as above stated. At the end of a short angle of movement of arm 10, the nut seats as described; the pressure of spring 26 is taken up against the end of sleeve 5, and the only resistance to further movement of plate 8 is provided by the relatively small pressure of spring 25.

The described structure and operative features are, of course, valuable and available with a lever arm of any ordinary or reasonable length. They are, in many cases, however, especially valuable where it is desired to make the effective length of arm 10 quite small, and this length is proportionately represented in the drawing as about one-half the usual radius. Such an arm length or arrangement may be desirable in many cases, a sufficient example being when the spring-controlling appliance is to be applied to the front axles of motor vehicles, the amplitude of whose movement is usually considerably less than that of the rear axle. When the amplitude of axle movement is small, the movement of the end of the lever arm or the shock absorber is correspondingly small, and any danger of a "reversal" or "toggle" action by reason of undue angularity of the lever arm is avoided. The stated friction resistance applied near the axis of the lever therefore has a much greater retarding effect than in the case of a longer arm, and this fact is taken advantage of in the present invention to provide a smaller number of friction members or friction surfaces than would be desirable in other cases, as for example, in my other contemporaneous applications above identified, where provision is made by means of a greater number of friction members or surfaces, or otherwise, for a greater net frictional resistance to the movement of a longer lever arm, which is required for rear axle installations or for other reasons. The present invention is, however, evidently not limited to front axle installations, since by proper design a sufficient retarding effect can be provided for a lever arm of any reasonable length.

A shock absorbing appliance especially designed for application at the front end of the vehicle, in accordance with the general principle of the present invention, is especially available for use on vehicles having front wheel brakes, since by the proper arrangement of the shock absorber proper on the vehicle side frame member, and by the provision of a proper link connection between the short lever arm and the vehicle axle, interference with the brake drum and operating linkage can be entirely avoided. A companion application shows, describes and claims such an installation, structure or arrangement and it is therefore not claimed herein.

Fig. 3 shows a modified construction in which the spindle 3 and spring 26 are so arranged that the inner end of the spring seats on a shoulder 3ª provided on the spindle. A clearance, as clearly shown, is provided between the outer end of the nut and the inner end of the spring. The spring is of such width that it overlaps the spindle shoulder and a portion of the inner spring end confronts the end of the nut. With this arrangement the action of the appliance during the approximately free range of movement is somewhat changed. In a counter-clockwise movement of plate 8 (as viewed in Fig. 1), corresponding to vehicle spring recoil movement, when the appliance is arranged as heretofore described to oppose the greatest resistance to spring recoil, the nut first moves outward freely until its outer end strikes the inner end of spring 26 after the clearance at that point is taken up, and then the windup period or angle of plate movement during which spring 26 is compressed, commences and continues until the clearance provided by recess 34 is taken up, and then plate 15 is locked against the nut. In other respects the action is practically the same as in the other example.

The present structure is similar to the structures shown in my application, Ser. No. 713,532, filed May 15, 1924, in that the friction plate 8 to which the lever arm 10 is connected is located directly adjacent the base plate 1 and these plates have co-operating contacting surfaces; but the present invention is distinguished from the other structure in that the engaging surfaces of the plates in the previous structure are of relatively large average radius and have a relatively high friction coefficient, so that a very substantial friction effect is obtained at this point; while in the present invention the stated engaging surfaces are of relatively small average radius and have a relatively low friction coefficient, or in some cases the friction coefficient is so small that it may be considered substantially negligible, and the surfaces then serve merely as a thrust bearing to take up the thrust of the arm plate against the base plate as it rotates about the spindle. This distinction is expressed in the claims, where other sufficient distinctions are not made.

The present invention is similar to the structures shown in my application, Ser. No. 713,533, also filed May 15, 1924, in the respect that in the structures of both applications there is a surface of small average radius or low friction coefficient on the base plate co-operating with a friction member. In the above-identified application, however, the member in contact with the base plate surface is not the main friction plate or the one to which the lever arm is connected, but is a distinct element irrevolubly connected to a member designated as the pressure member; while in the present application the main friction plate or arm plate is in direct contact with the friction or bearing surface of the base plate. This distinction is expressed in certain of the claims where other sufficient distinctions are not incorporated.

I claim:—

1. A vehicle spring controller comprising a friction member adapted for connection to one of two relatively movable vehicle parts such as the frame and axle, said member having a friction surface of relatively small average radius, a second relatively revoluble friction member having a surface in contact with the friction surface of the first member and adapted for connection to the other of said vehicle parts, a third friction member having a friction surface co-operating with a surface of the second member, said contacting surfaces having a relatively high friction value, and means comprising a yieldable pressure element and an inclined element co-operating to produce friction pressure.

2. A vehicle spring controller comprising a friction member adapted for connection to one of two relatively movable vehicle parts such as the frame and axle, said member having a friction surface with a relatively low friction coefficient, a second relatively revoluble friction member having a surface in contact with the friction surface of the first member and adapted for connection to the other of said vehicle parts, a third friction member having a surface co-operating with a friction surface of the second member, said contacting surfaces being of relatively large average radius and having a relatively high friction coefficient, and means comprising a yieldable pressure element and an inclined element co-operating to produce varying friction pressures in different relative directions of movement of the first and second friction members.

3. A vehicle spring controller comprising a friction member adapted to be secured to a vehicle frame member, said member having a friction surface of relatively small average friction value, a relatively revoluble friction member having a lever arm adapted for connection to a vehicle axle and also having a surface in contact with the friction surface of the first member, a third friction member having a surface co-operating with a friction surface of the second member, said contacting surfaces having a relatively high friction value, and means comprising a yieldable pressure element and an inclined element co-operating to produce varying friction pressures in different relative directions of movement of the first and second friction members.

4. A vehicle spring controller comprising a friction member adapted for connection to one of two relatively movable vehicle parts such as the frame and axle, said member having a friction surface of relatively small average radius, a second relatively revoluble friction member having a surface in contact with the friction surface of the first member and adapted for connection to the other of said vehicle parts, a third friction member having a friction surface co-operating with a surface of the second member, said contacting surfaces having a relatively high friction value, a spring for producing friction pressure, and an inclined element co-operating with the third friction member to affect the spring action.

5. A vehicle spring controller comprising a friction member adapted for connection to one of two relatively movable vehicle parts such as the frame and axle, said member having a friction surface of relatively small average radius, a second relatively revoluble friction member having a surface in contact with the friction surface of the first member and adapted for connection to the other of said vehicle parts, a third friction member having a friction surface co-operating with a surface of the second member, said contacting surfaces having a relatively high friction value, a spring for producing friction pressure, and an inclined element co-operating with the third friction member to affect the spring action differently in different relative directions of movement of the first and second members.

6. A vehicle spring controller comprising a friction member adapted for connection to one of two relatively movable vehicle parts such as the frame and axle, said member having a friction surface of relatively small average radius, a second relatively revoluble friction member having a surface in contact with the friction surface of the first member and adapted for connection to the other of said vehicle parts, a third friction member having a friction surface co-operating with a surface of the second member, said contacting surfaces having a relatively high friction value, a spring, and means including an inclined element and a shiftable member co-operating with the spring to vary its pressure effect in different directions of relative movement of the first and second members.

7. A vehicle spring controller comprising a friction member adapted for connection to one of two relatively movable vehicle parts such as the frame and axle, said member having a friction surface of relatively small average radius, a second relatively revoluble friction member having a surface in contact with the friction surface of the first member and adapted for connection to the other of said vehicle parts, a third friction member having a friction surface co-operating with a surface of the second member, said contacting surfaces having a relatively high friction value, a spring, and means including an inclined element and a shiftable member co-operating with the spring to render the spring effective to produce friction pressure in one direction of relative rotation of the first and second members, and to make the pressure of said spring self-contained and ineffective to produce friction pressure in the other direction of movement.

8. A vehicle spring controller comprising a friction member adapted for connection to one of two relatively movable vehicle parts such as the frame and axle, said member having a friction surface of relatively small average radius, a second relatively revoluble friction member having a surface in contact with the friction surface of the first member and adapted for connection to the other of said vehicle parts, a third friction member having a friction surface co-operating with a surface of the second member, said contacting surfaces having a relatively high friction value, a spring acting upon the third friction member to produce friction pressure, another spring, and means including a shiftable member and an inclined element co-operating with the second spring to vary its pressure effect in different directions of relative movement of the first and second members.

9. A vehicle spring controller comprising a friction member adapted for connection to one of two relatively movable vehicle parts such as the frame and axle, said member having a friction surface of relatively small average radius, a second relatively revoluble friction member having a surface in contact with the friction surface of the first member and adapted for connection to the other of said vehicle parts, a third friction member having a friction surface co-operating with a surface of the second member, said contacting surfaces having a relatively high friction value, a spring acting upon the third friction member to produce friction pressure, a second spring, and means including a shiftable member and an inclined element co-operating with the springs to vary the pressure effect in different directions of relative movement of the first and second members, and to render the second effective to produce pressure in one direction of relative rotation of the first and second members and to make the pressure of said spring self-contained and ineffective to produce friction pressure in the other direction of movement.

10. A vehicle spring controller comprising a base member adapted to be secured to a vehicle part such as a frame member, a friction plate revolubly mounted adjacent the base and having an arm arranged for connection to another vehicle part such as the axle, said friction plate and base having co-operating friction surfaces of small friction value, a shifter arranged for axial movement and held against rotation, a pressure plate having screw-thread connection with the shifter, said pressure plate and friction plate having co-operating friction surfaces of relatively high friction value, and yieldable pressure means for producing friction pressure on the different surfaces in co-operation with the pressure plate and shifter.

11. A vehicle spring controller comprising a base member adapted to be secured to a vehicle part such as a frame member, a friction plate revolubly mounted adjacent the base and having an arm arranged for connection to another vehicle part such as the axle, said friction plate and base having cooperating friction surfaces of small friction coefficient and relatively moderate average radius, a shifter arranged for axial movement and held against rotation, a pressure plate having screw-thread connection with the shifter, said pressure plate and friction plate having co-operating friction surfaces of relatively large average radius, and relatively high friction coefficient, and yieldable pressure means for producing friction pressure on the different surfaces in co-operation with the pressure plate and shifter.

12. A vehicle spring controller comprising a base member adapted to be secured to a vehicle part such as a frame member, a friction plate revolubly mounted adjacent the base and having an arm arranged for connection to another vehicle part such as the axle, said friction plate and base having co-operating friction surfaces of small friction value, a shifter arranged for axial movement and held against rotation, a pressure plate having screw-thread connection with the shifter, said pressure plate and friction plate having co-operating friction surfaces of relatively high friction value, and a spring acting between an abutment and the pressure plate.

13. A vehicle spring controller comprising a base member adapted to be secured to a vehicle part such as a frame member, a friction plate revolubly mounted adjacent the base and having an arm arranged for connection to another vehicle part such as the axle, said friction plate and base having co-operating friction surfaces of small friction value, a shifter arranged for axial movement and held against rotation, a pressure plate having screw-thread connection with the shifter, said pressure plate and friction plate having co-operating friction surfaces of relatively high friction value, and a spring acting between an abutment and the shifter.

14. A vehicle spring controller comprising a base member adapted to be secured to a vehicle part such as a frame member, a friction plate revolubly mounted adjacent the base and having an arm arranged for connection to another vehicle part such as the axle, said friction plate and base having co-operating friction surfaces of small friction value, a shifter arranged for axial movement and held against rotation, a pressure plate having screw-thread connection with the shifter, said pressure plate and friction plate having co-operating friction surfaces of relatively high friction value, a spring acting between an abutment and the pressure plate, and another spring acting between an abutment and the shifter.

15. A vehicle spring controller comprising a base member adapted to be secured to a vehicle part such as a frame member, a friction plate revolubly mounted adjacent the base and having an arm arranged for connection to another vehicle part such as the axle, said friction plate and base having co-operating friction surfaces of small friction value, a shifter arranged for axial movement and held against rotation, a pressure plate having screw-thread connection with the shifter, said pressure plate and friction plate having co-operating friction surfaces of relatively high friction value, yieldable pressure means for producing friction pressure on the different surfaces in co-operation with the pressure plate and shifter, and a housing tightly secured to the friction plate and enclosing the pressure plate, shifter and yieldable means and adapted to contain a non-solid, lubricating and noise-reducing substance.

16. A vehicle spring controller comprising a base plate adapted to be secured to a vehicle part such as a frame member, a friction plate revolubly mounted adjacent the base plate and having a lever arm arranged for connection to a vehicle axle, the base plate having a thrust bearing surface of low friction value for the friction plate, a shifter arranged for axial movement and connected irrevolubly with the base, a pressure member having screw thread engagement with the shifter and having a friction surface co-operating with the friction plate, and yieldable means urging the friction surfaces into friction contact and also holding the friction plate in contact with said thrust bearing surfaces.

17. A vehicle spring controller comprising a base plate adapted to be secured to a vehicle part such as a frame member, a spindle extending therefrom, a friction plate revolubly mounted about the spindle axis adjacent the base plate and having a lever arm adapted for connection to the vehicle axle, the base plate having a thrust bearing surface of low friction value for the friction plate, a shifter arranged for axial movement on the spindle and connected irrevolubly with respect to the base, a pressure member having screw thread engagement with the shifter and having a friction surface co-operating with the friction plate, and yieldable means urging the friction surfaces into friction contact and also hold the friction plate in contact with said thrust bearing surface.

18. A vehicle spring controller comprising a base plate having attachment means, a spindle extending therefrom, a friction plate mounted to rotate about the spindle axis and having an outward surface engaging a thrust bearing surface of low friction value on the base plate, a shifter arranged for axial movement on the spindle and having jaws engaging with jaws on the base plate to prevent shifter rotation, a pressure plate having screw thread connection with the shifter and having a friction surface co-operating with the friction plate, an adjustable abutment secured to an outward part of the spindle, and yieldable means reacting against the abutment and serving to produce friction pressure at the friction surfaces.

19. A vehicle spring controller comprising a base plate having attachment means, a spindle extending therefrom, a friction plate mounted to rotate about the spindle axis and having an outward surface engaging a thrust bearing surface of low friction value on the base plate, a shifter arranged for axial movement on the spindle and having jaws engaging with jaws on the base plate to prevent shifter rotation, a pressure plate having screw thread connection with the shifter and having a friction surface co-operating with the friction plate, an adjustable abutment secured to an outward part of the spindle, and a spring compressed between the abutment and the pressure member.

20. A vehicle spring controller comprising a base plate having attachment means, a spindle extending therefrom, a friction plate mounted to rotate about the spindle axis and having an outward surface engaging a thrust bearing surface of low friction value on the base plate, a shifter arranged for axial movement on the spindle and having jaws engaging with jaws on the base plate to prevent shifter rotation, a pressure plate having screw thread connection with the shifter and having a friction surface co-operating with the friction plate, an adjustable abutment secured to an outward part of the spindle, and a spring compressed between the abutment and the shifter.

21. A vehicle spring controller comprising a base plate having attachment means, a spindle extending therefrom, a friction plate mounted to rotate about the spindle axis and having an outward surface engaging a thrust bearing surface of low friction value on the base plate, a shifter arranged for axial movement on the spindle and having jaws engaging with jaws on the base plate to prevent shifter rotation, a pressure plate having screw thread connection with the shifter and having a friction surface co-operating with the friction plate, an adjustable abutment secured to an outward part of the spindle, a spring compressed between the abutment and the pressure member, and another spring compressed between the abutment and the shifter.

22. A vehicle spring controller comprising a base plate having attachment means, a spindle extending therefrom, a friction plate mounted to rotate about the spindle axis and having an outward surface engaging a thrust bearing surface of low friction value on the base plate, a shifter arranged for axial movement on the spindle and having jaws engaging with jaws on the base plate to prevent shifter rotation, a pressure plate having screw thread connection with the shifter and having a friction surface co-operating with the friction plate, an adjustable abutment secured to an outward part of the spindle, yieldable means reacting against the abutment and serving to produce friction pressure at the friction surfaces, and a cover tightly secured to the outer face of the friction plate and conformed to enclose with suitable clearance, the pressure plate, shifter and yieldable means, and serving to retain a lubricating and noise preventing medium.

23. A vehicle spring controller comprising a base plate having attachment means, a spindle extending therefrom, a friction plate mounted to rotate about the spindle axis and having an outward surface engaging a thrust bearing surface of low friction value on the base plate, a shifter arranged for axial movement on the spindle and having jaws engaging with jaws on the base plate to prevent shifter rotation, a pressure plate having screw thread connection with the shifter and having a friction surface co-operating with the friction plate, an adjustable abutment secured to an outward part of the spindle, a spring compressed between the abutment and the pressure member, and a cover tightly secured to the outer face of the friction plate and conformed to enclose with suitable clearance, the pressure plate, shifter and spring, and serving to retain a lubricant.

24. A vehicle spring controller comprising a base plate having attachment means, a spindle extending therefrom, a friction plate mounted to rotate about the spindle axis and having an outward surface engaging a thrust bearing surface of low friction value on the base plate, a shifter arranged for axial movement on the spindle and having jaws engaging with jaws on the base plate to prevent shifter rotation, a pressure plate having screw thread connection with the shifter and having a friction surface co-operating with the friction plate, an adjustable abutment secured to an outward part of the spindle, a spring compressed between the abutment and the pressure member, another spring compressed between the abutment and the shifter, and a cover tightly secured to the outer face of the friction plate and conformed to enclose with suitable clearance, the pressure plate, shifter and springs, and serving to retain a lubricating, cushioning and noise preventing medium.

Signed at Hoboken, in the county of Hudson and State of New Jersey, this third day of October, A. D. 1924.

RAYMOND P. LANSING.